Dec. 4, 1923.
F. S. DUESENBERG
1,476,328
AXLE CONSTRUCTION
Filed Dec. 4, 1920
2 Sheets-Sheet 1
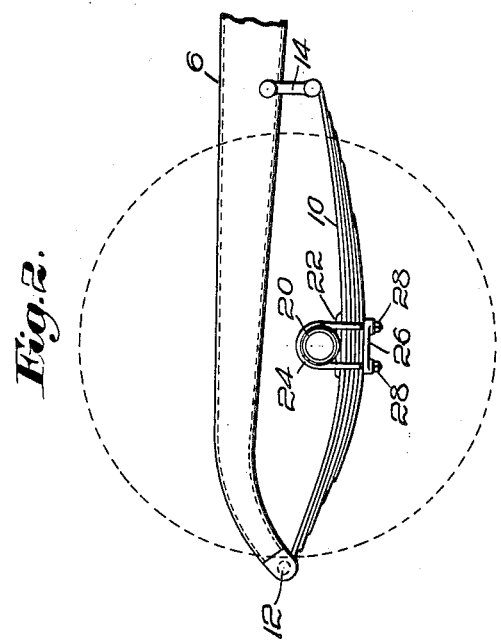
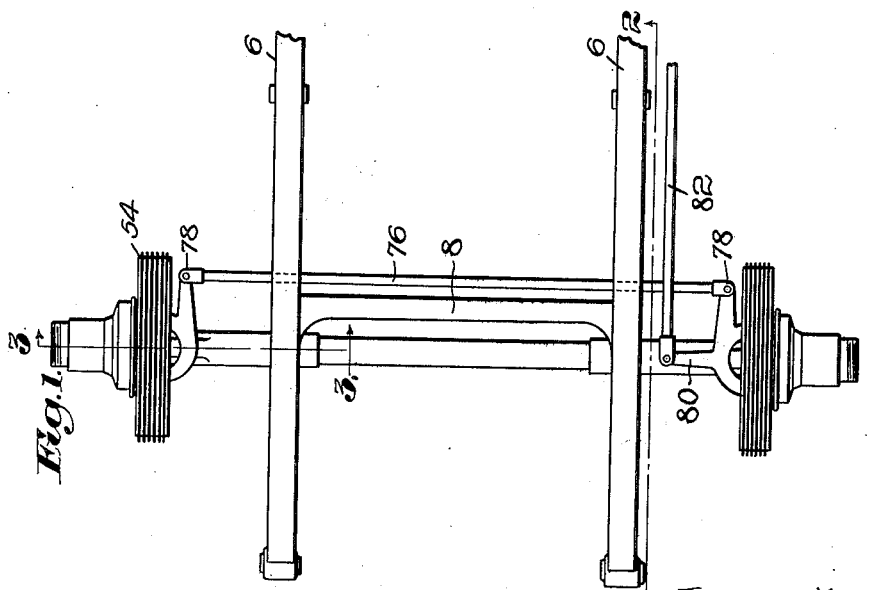
Inventor:
Frederick S. Duesenberg.
by Emery, Booth, Janney & Varney.
Attys.

Dec. 4, 1923.  1,476,328
F. S. DUESENBERG
AXLE CONSTRUCTION
Filed Dec. 4, 1920   2 Sheets-Sheet 2
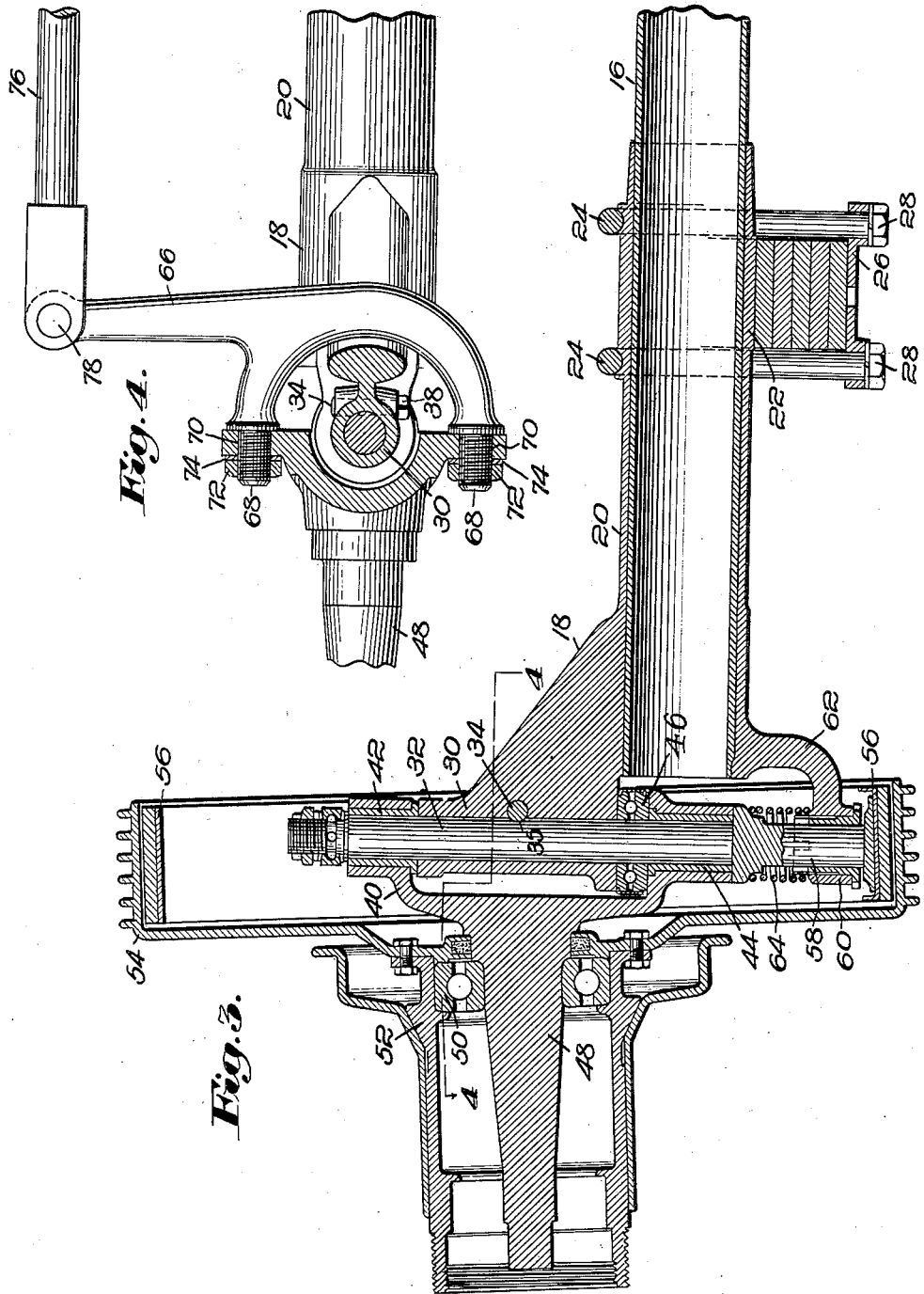
Inventor:
Frederick S. Duesenberg
by Emery, Booth, Janney & Varney
Attys.

Patented Dec. 4, 1923.

1,476,328

UNITED STATES PATENT OFFICE.

FREDERICK S. DUESENBERG, OF ELIZABETH, NEW JERSEY.

AXLE CONSTRUCTION.

Application filed December 4, 1920. Serial No. 428,365.

*To all whom it may concern:*

Be it known that I, FREDERICK S. DUESENBERG, a citizen of the United States, and a resident of Elizabeth, in the county of Union and State of New Jersey, have invented an Improvement in Axle Constructions, of which the following description, in connection with the accompanying drawings, is a specification, like characters on the drawings representing like parts.

This invention relates to axle constructions for steerable vehicles, being more particularly concerned with the axle by which the steering knuckles are carried, and the invention aims to provide a construction in which maximum strength is combined with minimum weight.

My invention will be best understood by reference to the following description, when taken in connection with the accompanying drawings of one specific embodiment thereof, while its scope will be more particularly pointed out in the appended claims.

In the drawings:

Fig. 1 is a plan of a portion of a motor vehicle chassis having an axle construction exemplifying my invention;

Fig. 2 is a sectional view on line 2—2 of Fig. 1;

Fig. 3 is a sectional view on an enlarged scale on line 3—3 of Fig. 1; and

Fig. 4 is a sectional view on line 4—4 of Fig. 3.

Referring to the drawings, and to the embodiment of my invention which I have selected for exemplification, the chassis comprises the usual frame having side members 6 connected by a cross member 8. The frame is spring-supported by suitable springs, herein usual semi-elliptic springs 10 pivotally connected at their forward ends to the side members by bolts 12, and at their rear ends by shackles 14, all of usual construction.

The springs are supported by an axle of novel construction now to be described, reference being had particularly to Fig. 3. The axle comprises a cross member 16, preferably a tube which is suitably secured to a pair of terminal members 18, as by forming the latter integral with a sleeve 20, in which the tube is received, and suitably secured as by brazing or welding. The sleeve 20 is provided with an integral spring seat 22, to which the spring is secured in any usual or suitable manner, as by a pair of U-shaped bolts 24 extending through a plate 26, and provided with nuts 28 to clamp the spring againts the spring seat. In the present example, the spring is underslung,— that is to say, it is placed below the axle. This arrangement is preferred, because it is an important factor in enabling me to use a straight axle, instead of one which is curved in the usual manner.

Each of the terminal members is provided with a boss 30 to receive a steering-knuckle pivot 32, herein secured thereto by a tapered pin 34, which extends through the boss and is received in a lateral recess 36 provided in the pivot. A nut 38 threaded onto the smaller end of the tapered pin holds the latter in place.

A steering knuckle 40 is provided with bearings 42 and 44 mounted to turn on the pivot, and receiving between them the boss 30. Ease of steering may be secured by a thrust bearing 46 interposed between the boss 30 and the bearing 44.

Each of the steering knuckles is provided with a stub axle or wheel spindle 48, having usual bearings 50 on which is mounted to turn a conventional wheel having a hub 52, to which is secured a brake-drum 54 cooperating with a brake-band 56, herein acting internally on the brake-drum. The brake-band is carried by a support 58, which is coupled to the steering knuckle and is turned thereby in a bearing 60, the latter being supported by an ear 62 herein formed as an integral part of the terminal member 18. A spring 64 is arranged to keep the support coupled to the steering kunckle, and to withdraw the brake-band from the drum. The particular construction of the brakes, however, forms no part of my present invention.

The steering knuckles are turned on their pivots by steering arms 66 of novel construction, each secured to its knuckle at opposite sides, respectively, of the pivotal axes, as by providing the arm with a pair of stems 68 which extend generally parallel with the spindle 48, and pass through openings 70 provided in the steering knuckle, and are threaded to receive nuts 72 by means of which they are secured to the steering knuckle. Suitable lock washers 74, interposed between the nuts and the steering knuckle, prevent accidental turning movement of the nuts. This construction affords great strength, combined with light weight, owing to the fact that the steering arm is secured to the steering knuckle at widely separated points on opposite sides of the pivot. The steering arms are connected by a usual cross-rod or link 76, pivoted at 78 to the steering arms. One of the latter is provided with an arm 80, to which is pivotally attached a usual drag-link 82.

An important feature of my invention is the use of the terminal members 18 having the integrally formed spring seats 22, to which the springs are secured. By the use of this construction, stresses are transmitted directly from the steering-knuckle support to the spring seat and spring, particularly when applying the front wheel brakes, thus avoiding subjecting the axle tube 16 to any torsional stresses. The latter can, therefore, be made much lighter than would otherwise be possible, and there is a considerable saving of weight.

Having thus described one illustrative embodiment of my invention, but without limiting myself thereto, what I claim and desire by Letters Patent to secure is:

1. In a vehicle, the combination of an axle, two steering knuckles pivoted thereto, two steering members each having an arm extending transversely of said axle and one member having an arm extending lengthwise of said axle, each member having two branches respectively secured to the associated knuckle at the front and rear respectively of the pivotal axis of such knuckle, a link extending lengthwise of said axle and connecting said transversely extending arms to each other, and a link extending transversely of said axle and attached to said arm which extends lengthwise of said axle.

2. In a vehicle, the combination of an axle, two steering knuckles, pivots connecting said knuckles, respectively, to said axle, two steering arms, each having two distinct branches rigidly secured to its associated knuckle, between which branches the pivot of such knuckle is received, and a link extending lengthwise of said axle and connecting said arms to each other.

3. In a vehicle, the combination of an axle having two bosses, one adjacent each end, two steering knuckles, pivots connecting said knuckles to said bosses, respectively, two steering arms extending transversely of said axle, and each having a part arranged about its associated boss and pivot, and a link extending lengthwise of said axle and connecting said arms to each other.

4. In a vehicle, the combination of an axle, steering knuckles pivoted thereto and provided each with a wheel spindle, two steering arms extending transversely of said spindles, respectively, two sets of fastening means generally parallel with said spindles and securing said arms to said knuckles, respectively, at front and back, respectively, of the axes of said knuckles, and a link extending lengthwise of said axle and connecting said knuckles to each other.

In testimony whereof, I have signed my name to this specification.

FREDERICK S. DUESENBERG.